United States Patent [19]
Ernst et al.

[11] 3,948,370
[45] Apr. 6, 1976

[54] FRICTION CLUTCH AND BEARING ASSEMBLY

[75] Inventors: Horst Ernst, Elitingshausen; Manfred Brandenstein, Aschfeld; Armin Olschewski, Schweinfurt, all of Germany

[73] Assignee: SKF Industrial Trading and Development Company, B.V., Amsterdam, Netherlands

[22] Filed: May 31, 1974

[21] Appl. No.: 475,320

[30] Foreign Application Priority Data
June 1, 1973  Germany.............................. 2327936

[52] U.S. Cl.................................. 192/98; 308/235
[51] Int. Cl.²......................................... F16D 19/00
[58] Field of Search................... 192/89 B, 99 A, 98

[56] References Cited
UNITED STATES PATENTS
1,099,509   6/1914   Nelson.............................. 192/99 A
1,756,428   4/1930   Jones............................ 192/99 A X
3,365,040   1/1968   Pitner.................................. 192/98

FOREIGN PATENTS OR APPLICATIONS
1,814,172   6/1970   Germany.............................. 192/98

Primary Examiner—Benjamin W. Wyche
Attorney, Agent, or Firm—Murray Schaffer

[57]         ABSTRACT

A friction clutch and bearing assembly. The friction clutch is provided with a spring release member having a central bore, the inner peripheral edge of which is rolled into an annular torus opening radially outwardly toward the bearing. The bearing is provided with a race member formed of sheet metal having a radially extending flange wall adapted to engage against the frontal face of the spring release member and an inner beaded edge adapted to lie within the torus and to be resiliently grasped thereby.

5 Claims, 1 Drawing Figure

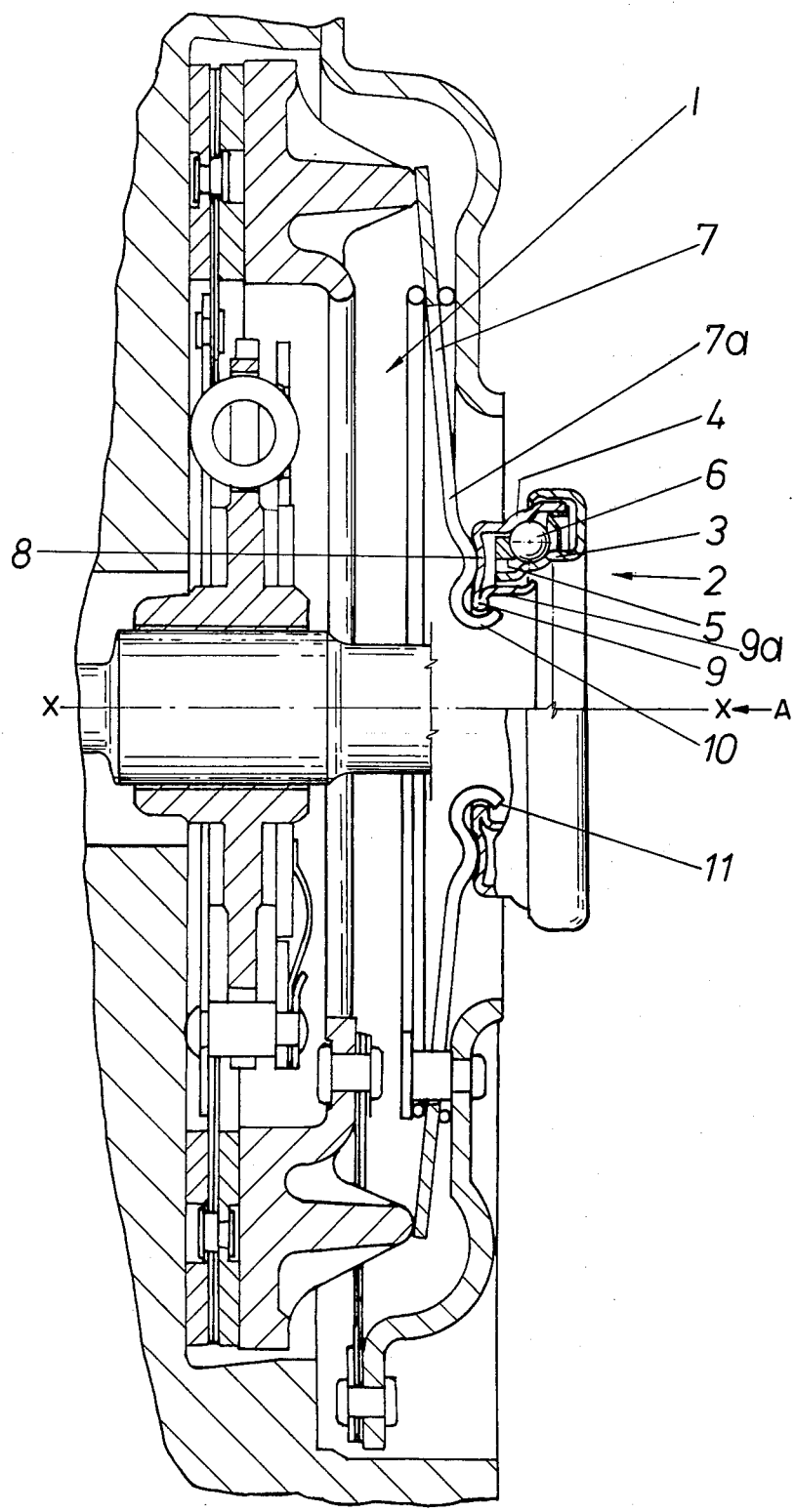

FRICTION CLUTCH AND BEARING ASSEMBLY

BACKGROUND OF THE INVENTION

The present invention relates to a friction clutch and bearing assembly and in particular to the means for connecting the clutch bearing to the spring release member of the friction clutch.

Friction clutches and release bearing assemblies are well known in which the release bearing is formed from a conventional roller bearing having an outer race ring on whose outer surface an annular groove is provided. The spring release member of the friction clutch comprises a diaphragm or disc-type spring, such as a belleville spring having a plurality of inwardly directed springlike arms or tongues. In this conventional construction the spring arms resiliently enter into and engage within the annular groove of the outer race ring. The bearing, and particularly the outer race ring is formed from solid massive material which on the one hand creates a bearing having a relatively large radial dimension and on the other hand creates a bearing which is relatively heavy, thereby provided an assembly of friction clutch and bearing which is extremely large. In addition, in order to assemble the bearing on the spring release member it is necessary to provide the spring release member with an enlarged central bore. The spring arms of the spring release member are thereby relatively small reducing the lever arm (moment) consequently necessitating the application of relatively high release forces in order to operate the clutch. Reference may be made to U.S. Pat. No. 2,485,214 as well as U.S. Pat. No. 3,712,435 for a more detailed description of conventional friction clutch and bearing assemblies.

It is the object of the present invention to provide a friction clutch and bearing assembly in which the disadvantages and defects of the prior art are overcome.

It is a further object of the present invention to provide a friction clutch and bearing assembly in which the bearing may be connected to the clutch to form a unitary assembly therewith and may be as well removable and separable therefrom in order to disassemble the device, all in any easy and simple manner without any large expenditure in time or effort.

It is a further object of the present invention to provide a friction clutch and bearing assembly in which the weight and mass of the bearing and simultaneously of the clutch is reduced.

It is still a further object of the present invention to provide a friction clutch and bearing assembly in which the spring release arms of the spring release member may be so enlarged so as to increase the lever arm moment and thereby reduce the release forces necessary to operate the same.

The foregoing objects, other objects and numerous advantages will be apparent from the following disclosure of the present invention.

SUMMARY OF THE INVENTION

The foregoing objects of the present invention are obtained by providing a friction clutch and bearing assembly in which the friction clutch is provided with a disc-like spring release member having a central bore, the inner peripheral edge of which is rolled into an annular torus opening radially outward toward the bearing. The bearing is provided with a race member formed of sheet metal having a radially extending flange wall adapted to engage against the frontal face of the spring release member and is provided with an inner beaded edge adapted to lie within the torus and to be resiliently grasped by the spring release member so as to be connected thereto in a removable manner.

By providing a release bearing having a race ring formed from thin walled sheet metal the bearing is on the one hand reduced in its radial dimension and on the other hand reduced in its mass and weight.

Preferably, the outer race ring of the release bearing is formed with the radial wall and the beaded edge. The race ring is thus provided with a radially inwardly directed portion forming the flange wall which is bent upwardly against itself, in a reverse angle, to form the annular bead. By thus forming the outer race ring in this manner and by forming the peripheral inner edge of the spring release member with its annular torus a simple and quick connection of the bearing and the friction clutch can be obtained. A further advantage is obtained from this construction by the fact that the spring arms or tongues of the spring release member engage against the frontal face of the radial flange of the outer race ring. Thus, the spring arms or tongues can be made longer than normally expected and thereby the lever arm moment can be enlarged and therewith a notable reduction in release force obtained.

Full details of the present invention are shown in the accompanying drawing and are given in the following description thereof.

BRIEF DESCRIPTION OF THE DRAWINGS

In the accompanying drawing the figure is a sectional view of a friction clutch and release bearing assembly embodying the present invention.

DESCRIPTION OF THE INVENTION

The assembly shown in the drawing comprises a friction clutch, depicted by the numeral 1 and a clutch release bearing, depicted by the numeral 2, which are generally of conventional and well known form except as hereinafter described. Consequently, in order to maintain brevity and conciseness of this disclosure extensive descriptions are omitted. Reference may be made however to the aforementioned prior patents and conventional commercial constructions for more complete details.

The clutch release bearing 2 comprises an inner race ring 3 and an outer race ring 4, between which is arranged a cage 5 containing a plurality of rolling bodies 6, such as balls or the like. Both race rings are formed from thin walled sheet metal and are bent in a somewhat U-shaped cross section. The use of sheet metal and its formation as the race rings of a rolling bearing are well known and the application to the present construction may be made conventionally.

The friction clutch 1 includes a spring release member 7 comprising a diaphragm or disc-shaped member such as a belleville spring defining a radially inwardly directed spring finger or tongue 7a, terminating in a central bore. The spring release member may be provided with one or more radial slots defining one or more inwardly directed spring fingers, if desired.

The outer race ring 4 of the clutch release bearing 2 is provided with a radially inwardly directed annular flange 8 which forms a wall substantially transverse to the central axis X—X which is positioned and curved to matchingly engage the frontal face of the spring release member 7 in its equally curved section. The flange 8 of the outer race ring is further extended being bent into a reverse angle (180°) to form an annular bead 9 along its inner periphery. The race ring may be extended further in a cylindrical wall 9a axially beneath the inner ring 3 so as to define a concentric wall for the central bore of the bearing about the axis X—X.

The inner ends of the spring release arms 7a are bent into a torus 10 having a peripheral edge 11 extending upwardly away from the central bore and toward the position of the release bearing. The torus 10 is open at its outer portion so as to receive and resiliently fit about and retain the bead 9 of the outer race ring 4. The release bearing 2 is thus securely and resiliently retained within the spring release member as a unitary assembly, without entry through the central bore of the spring release member. The point of contact between the spring arms 7a and the annular flange wall 8 and the bead 9 lie well within the greatest outward diameter of the release bearing. Therefore, the spring release arms 7a can be made relatively long so that their lever arm moment in enlarged. Consequently, the force necessary to release the clutch can be correspondingly reduced.

At their point of contact the frontal face of the arm 7 and the radial flange 8 of the outer bearing race are provided with corresponding convex and concave curvatures. As a result the bearing 2 is automatically self-centering with respect to the spring release member even under extreme load conditions.

The assembly of the bearing 2 on the spring release member 1 is made in a simple manner by merely pushing the bearing onto the spring release member in the general direction of the arrow A. The bearing may be canted or tilted to facilitate snapping of the bead 9, over the edge 11 into the torus 10, however simple pushing operation is all that will be generally required, due to the resiliency of the spring arms 7a. Once the bead 9 enters into the torus 10, the resilient nature of the arms 7a grasp and hold the bearing securely and in fixed operating position. The curvature of the torus and of the engaging frontal and radial flange faces insures sufficient counter-reaction stabilizing the parts in proper position and insuring automatic centering, on installation and during operation.

Similarly, to the step of installation, the removal and separation of the bearing 2 from the spring arm 7 is simply accomplished. By merely pulling the bearing apart from the arm in the direction counter to the arrow A, the bead 9 snaps off, over the edge 11.

It will be seen from the foregoing that the present invention provides an improved arrangement over those found in the prior art, and that the several objects and advantages enumerated earlier are all obtained. While the embodiment depicted shows the connection between the spring arm and the outer race ring, the connection can be made just as easily with the inner race ring, by forming the same with radial flange (outwardly directed) and with an inner peripheral bead. When the spring release member is provided with a plurality of spring arms, each of the arms or only some may be rolled to form cup shaped ends which jointly form the torus.

Various other changes and modifications have been suggested, others will be obvious to those skilled in this Art. It is accordingly intended that the present disclosure be taken as illustrative only and not as limiting of the scope of the present invention.

What is claimed:

1. An assembly of friction clutch and release bearing, said clutch being provided with a spring release member having, an inner peripheral edge defining a central bore, said spring release member being formed with a frontal face having a curved section adjacent said peripheral edge and rolled into a torus along its peripheral edge, said bearing having a sheet metal race ring having a radially extending wall provided with a curved section conforming to that of the frontal face of said spring release member and an inner beaded edge, said beaded edge being adapted to enter into said torus and said curved surfaces being adapted to engage each other.

2. The assembly according to claim 1, wherein said race ring engageable with said spring release member is the outer race ring having a radially directed portion forming said extending wall, and having its peripheral edge formed with said bead.

3. The assembly according to claim 2, wherein said beaded edge is formed by folding over the edge of said outer race ring facing said torus at a reverse angle.

4. The assembly according to claim 1 wherein said spring release member is provided with a plurality of radially inwardly directed arms, the ends of at least some of said arms being rolled to form said torus.

5. The assembly according to claim 1, wherein said curved sections on the frontal face of said spring release member and on the race ring radially extending wall are, respectively, convex and concave.

* * * * *